Patented Dec. 25, 1934

1,985,424

UNITED STATES PATENT OFFICE 1,985,424

ALKYLENE-OXIDE DERIVATIVES OF POLY-HYDROXYALKYL-ALKYLAMIDES

Henry Alfred Piggott, Blackley, Manchester, England, assignor to Imperial Chemical Industries Limited, a corporation of Great Britain No Drawing. Application March 15, 1934, Serial No. 715,776. In Great Britain March 23, 1933

20 Claims. (Cl. 260—124)

This invention relates to the manufacture and application of new textile assistants.

According to my present invention new textile assistants are manufactured by interacting an alkylene oxide, preferably ethylene oxide, and the condensation product of an organic carboxylic acid containing at least 3 atoms of carbon with primary or secondary aliphatic amines containing at least 5 atoms of carbon of which every one carries an hydroxyl group except that which carries the amino group.

My invention also includes the process of reacting an organic carboxylic acid containing at least 3 atoms of carbon with a primary or secondary amine containing at least 5 atoms of carbon, of which every one carries an hydroxyl group except that which carries the amino group.

According to a further feature of the invention I use the compounds obtained or obtainable by the process of either of the two preceding paragraphs as textile assistants, for instance, for addition to the indigo vat for improving the rubbing fastness.

In carrying the invention into practical effect according to the first feature I may mix the alkylene oxide, preferably ethylene oxide with the amine and heat without a catalyst and even without a medium, heating being effected where necessary in a closed vessel. The amine may if desired be used in the form of a salt.

Primary or secondary aliphatic amines suitable for use according to my invention may be prepared by reducing sugars containing 5 or more carbon atoms in presence of amines with hydrogen and a hydrogenation catalyst.

The following examples in which the parts are by weight illustrate but do not limit the invention.

*Example 1.*—A mixture of 200 parts of methylglucamine (obtained by heating glucose and aqueous methylamine in presence of hydrogen and a hydrogenating catalyst under pressure) and 286 parts of stearic acid is heated with stirring at 160° for 5 hours at the end of which time water vapor is no longer evolved, and an aqueous solution of the melt gives no precipitate of stearic acid on acidification. The product is a light-brown microcrystalline solid which dissolves in water to a colorless readily foaming solution.

*Example 2.*—If the stearic acid in the above preparation be replaced by oleic acid the product is a light-brown pasty mass, which dissolves more readily in water than does the preceding.

*Example 3.*—50 parts of the product from Example 1 and 40 parts of ethylene oxide are heated together in a sealed pressure-resisting vessel at 120° C. for 10 hours. At the end of this period the components are found to have combined to an almost black pasty mass, which is readily soluble in water to a feebly alkaline, foaming solution, and possesses pronounced dispersing and emulsifying properties.

*Example 4.*—If in Example 3, 60 parts of ethylene oxide are used, a similar, but somewhat more basic product results.

*Example 5.*—50 parts of the product from Example 2 and 40 parts of ethylene oxide are heated together under the conditions described in Example 3. There is formed a dark colored liquid product which dissolves readily in cold water to a feebly alkaline solution.

*Example 6.*—A mixture of 125 parts of methylglucamine and 204 parts of the crude mixture of acids obtained by saponification of a low-grade spermaceti is heated while stirring in an open vessel at 160° C. for 2 hours, by which time the product is completely soluble in benzene. On cooling it sets to a brown waxy solid, soluble in hot water to a faintly opalescent solution which is unaffected by dilute acids.

*Example 7.*—50 parts of the product of Example 6 are heated with 155 parts of ethylene oxide in a closed vessel at 120° C. for 11 hours. A light-brown viscous liquid, readily soluble in water is obtained.

*Example 8.*—If in Example 6, the fatty acid is replaced by 208 parts of crude ricinoleic acid a very similar product is obtained, which is, however, more difficultly soluble in water. It condenses with 3 times its weight of ethylene oxide at 120° C. to give a readily water-soluble product.

*Example 9.*—18 parts of crude product obtained by interaction of ammonia and glucose in the presence of hydrogen and a nickel catalyst at a pressure of 1000 lbs. per sq. in. and containing 60% by weight of glucamine is heated at 160° C. with 17 parts of steric acid while stirring until steam is no longer evolved; about 3 hours will be sufficient. A dark-brown solid, soluble in water to a clear, pale brown solution is obtained.

*Example 10.*—57 parts of the product of Example 9 are heated with 67 parts of ethylene oxide in a closed vessel at 120° C. until the internal pressure falls to zero. A viscous, dark-brown liquid, readily soluble in cold water to a clear, strongly foaming solution is obtained.

*Example 11.*—A mixture of 147 parts of methylglucamine with 166 parts of the acids from the saponification of coconut oil is heated with stirring at 160° C. until steam is no longer evolved.

A pale brown water-soluble waxy product is obtained; the aqueous solution possesses a marked wetting action on textile fabrics which is well maintained on dilution.

*Example 12.*—80 parts of the product from Example 11 are condensed with 90 parts of ethylene oxide at 120° C., in the usual way. A pale brown viscous oil readily soluble in cold water to a solution with marked wetting-out properties.

Without limiting this invention to any particular theory it will be stated that, according to my present understanding, the reaction of the alkyl carboxylic acid with the primary or secondary polyhydroxy-alkyl-amine produces predominantly, if not exclusively, an amide. The condensation product, where a glucamine is employed, will therefore correspond to the formula $$R-CO-NR_1-CH_2-(CHOH)_4-CH_2OH,$$

wherein R is an alkyl radical containing at least 3 carbon atoms, while $R_1$ is hydrogen or an alkyl radical. The interaction of this compound with an alkylene oxide apparently introduces ether groups between the carbon and hydroxyl group of some or each of the groups CHOH and $CH_2OH$. For instance, in the case of the group $CH_2OH$, the reaction with ethylene oxide may be represented as follows:

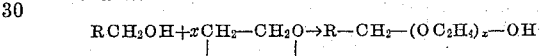

I claim:

1. The process for the manufacture of new textile assistants which consists in condensing an aliphatic carboxylic acid, containing not less than 10 atoms of carbon with an amine of the general formula $HNR_1R_2$, wherein $R_1$ is hydrogen or alkyl while $R_2$ is a polyhydroxy-alkyl radical containing at least 5 atoms of carbon, of which every one carries an hydroxyl group except that which carries the amine group.

2. The process for the manufacture of new textile assistants by interacting alkylene oxide and a condensation product obtainable according to the process claimed in claim 1.

3. A process for the manufacture of compounds which are adapted for use as textile assistants, which comprises reacting with ethylene oxide upon the reaction product of stearic acid and methyl-glucamine.

4. The compounds which correspond most probably to the general formula $R-CO-NR_1R_2$, wherein R is an alkyl radical containing at least 3 carbon atoms, $R_1$ is hydrogen or an alkyl group, while $R_2$ is a polyhydroxy-alkyl radical, containing at least 5 carbon atoms each of which carries a hydroxyl group except the one which is attached to the nitrogen atoms, said compounds being substantially identical with the products obtainable by interacting a carboxylic acid of the formula R—COOH with an amine of the formula $HNR_1R_2$, at a temperature sufficient to split off water, R, $R_1$ and $R_2$ having the same significance as above.

5. The reaction products of alkylene oxides with the compounds defined in claim 4.

6. The compounds which correspond most probably to the formula $$R-CO-NR_1-CH_2(CHOH)_4-CH_2OH,$$

wherein R is an alkyl radical containing at least 10 carbon atoms, and $R_1$ is hydrogen or alkyl, said compounds being substantially identical with the products obtainable by reacting a carboxylic acid of the general formula R—COOH with a glucamine of the general formula $$HNR_1-CH_2-(CHOH)_4-CH_2OH,$$

at about 160° C., R and $R_1$ having the same significance as above.

7. The reaction product of an alkylene oxide and a compound as defined in claim 6.

8. A compound which is most probably an amide of the general formula $$R-CONH-CH_2-(CHOH)_4-CH_2OH,$$

wherein R is an alkyl radical containing at least 10 carbon atoms, said compound being substantially identical with the product obtainable by reacting an acid of the general formula R—COOH, R having the same significance as above, with glucamine at a temperature of about 160° C.

9. The reaction product of ethylene oxide and an amide as defined in claim 8.

10. A compound which is most probably an amide of the general formula $$R-CO-N(CH_3)-CH_2-(CHOH)_4-CH_2OH,$$

wherein R is an alkyl radical containing at least 10 carbon atoms, said compound being substantially identical with the product obtainable by heating methyl-glucamine with an acid of the formula R—COOH, R having the same significance as above, at a temperature of about 160° C.

11. The reaction product of ethylene oxide and an amide as defined in claim 10.

12. Stearyl-methyl-glucamine.

13. The reaction product of ethylene oxide and stearyl methyl glucamine.

14. Stearyl-glucamine.

15. The reaction product of ethylene oxide and stearyl-glucamine.

16. Oleyl-methyl-glucamine.

17. The reaction product of ethylene oxide and oleyl-methyl-glucamine.

18. The process of producing a long-chain-polyhydroxy amide useful as a textile assistant, which comprises heating stearic acid with methyl glucamine at a temperature of about 160° C. until water-vapor is no longer evolved.

19. A process as in claim 18 followed by the further step of heating the reaction product obtained in claim 18 with ethylene oxide at a temperature of about 120° C.

20. A process as in claim 18 followed by the further step of heating 50 parts of the reaction product obtained in claim 18 with from 40 to 60 parts of ethylene oxide at a temperature of about 120° C.

HENRY ALFRED PIGGOTT.